United States Patent [19]
Warren et al.

[11] Patent Number: 5,907,421
[45] Date of Patent: May 25, 1999

[54] APPARATUS FOR SPECTRAL ENCODING AND DECODING OF FEMTOSECOND OPTICAL PULSES

[75] Inventors: Warren S. Warren, Lawrenceville; June-Koo Rhee, Hightstown; Hisashi Kobayashi, Princeton, all of N.J.

[73] Assignee: The Trustees of Princeton University, Princeton, N.J.

[21] Appl. No.: 08/619,090

[22] Filed: Mar. 20, 1996

[51] Int. Cl.$^6$ ................................................. H04B 10/04
[52] U.S. Cl. ......................... 359/180; 359/138; 359/182; 359/183
[58] Field of Search .................................. 359/180, 181, 359/188, 189, 190, 195, 161, 135, 138, 183, 182; 375/308, 323, 324, 325, 334

[56] References Cited

U.S. PATENT DOCUMENTS

| | | | |
|---|---|---|---|
| 5,181,136 | 1/1993 | Kavehrad et al. | 359/190 |
| 5,247,382 | 9/1993 | Suzuki | 359/156 |
| 5,253,097 | 10/1993 | Naito et al. | 359/192 |
| 5,355,243 | 10/1994 | King | 359/190 |
| 5,491,575 | 2/1996 | Neidlinger et al. | 359/137 |

*Primary Examiner*—Rafael Bacares
*Attorney, Agent, or Firm*—Ohlandt, Greeley, Ruggiero & Perle

[57] ABSTRACT

A DPSK communication system employs an optical signal which comprises plural, coherent, optical frequencies, each optical frequency positioned within a range of frequencies (i.e., a "frequency slot"). The optical signal comprises plural frequency slots, with the wavefront in each time segment of each frequency slot being phase modulated in accordance with data signals. Plural frequency slots are transmitted "in parallel", in each of a plurality of succeeding time segments. A demodulator includes first and second optical paths, the first component of the optical signal directed onto the first optical path and a second component directed onto the second optical path. A modulator is positioned in at least one of the optical paths and is responsive, during a time segment, to a first applied control signal, to alter the phase, and thus the frequency, of the first component by approximately one frequency slot. At the output of the first and second optical paths, an optical coupler interferes the first component and the second component so as to enable constructive and destructive interference therebetween in accordance with respective phase modulations thereof.

9 Claims, 5 Drawing Sheets

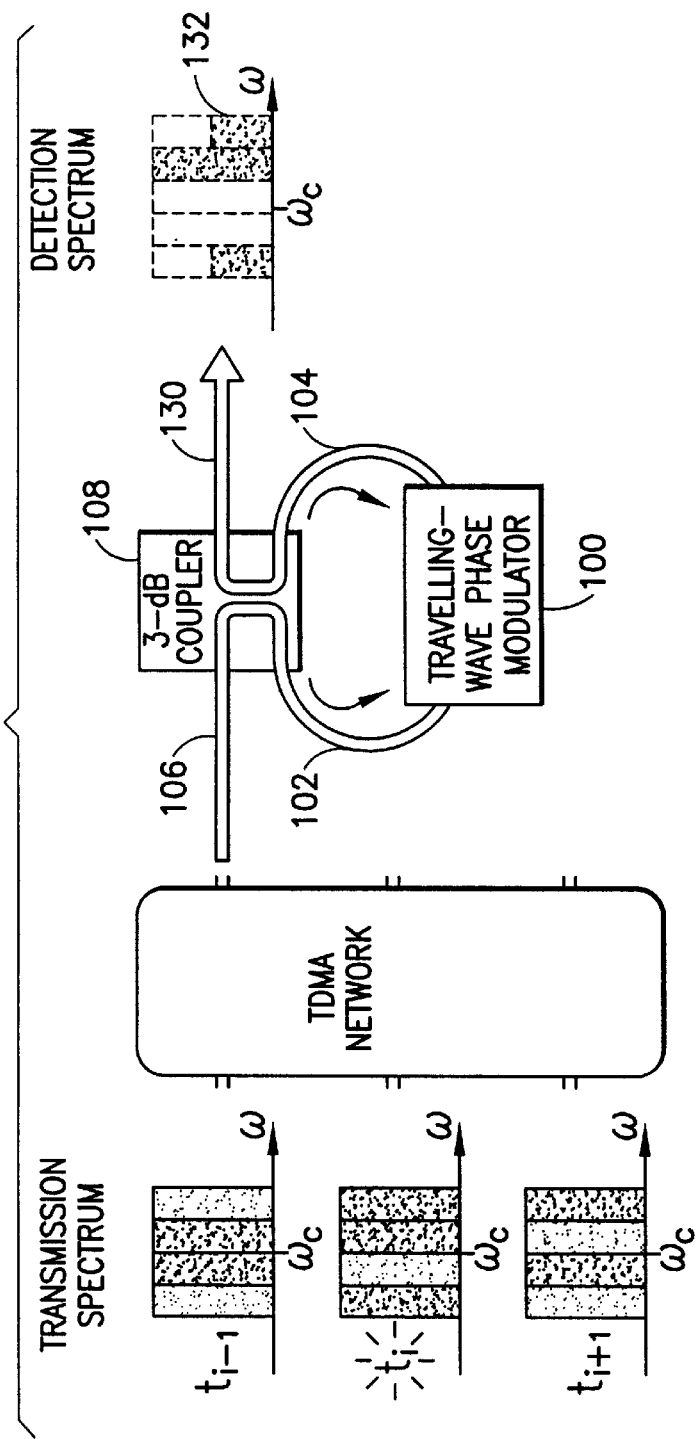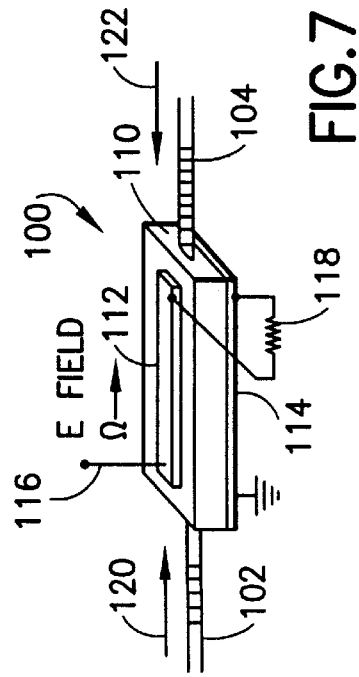

APPARATUS FOR SPECTRAL ENCODING AND DECODING OF FEMTOSECOND OPTICAL PULSES

FIELD OF THE INVENTION

This invention relates to encoding of data on an optical carrier, and more particularly, to apparatus for demodulating a wavelength division, multiplexed, phase-encoded optical signal.

BACKGROUND OF THE INVENTION

Phase shift keying (PSK) is a known method of data modulation wherein the phase of a carrier (to represent, for example, a binary code) is set at either 0° or 180° within a time frame. Demodulation of a PSK signal involves the comparison of the signal with a phase reference, to enable recovery of the phase shifted carrier signals. PSK encoding requires, by definition, the presence of a coherent reference signal at the receiver to enable the decoding operation to occur.

Differential phase-shift keying (DPSK) eliminates the need for the coherent reference signal by using, as the comparison signal, the phase modulated carrier itself, which has been delayed by one symbol (or bit) time. To send a "0" value, the signal carrier is advanced in phase by 180° from the signal carrier phase in the previous symbol time. To send the digital value "1", the phase of the signal carrier waveform is unchanged. The receiver is equipped with a storage facility so that it can measure the relative phase difference between the waveforms received during two successive bit intervals. Thus, the phase difference between the two waveforms, received over two successive bit intervals, enables the decoding of the signal stream and avoids the need for the presence of a coherent reference signal. DPSK encoding is widely used in time division multiple access (TDMA) systems wherein DPSK sequences are introduced in the carrier during succeeding time frames.

FIG. 1 illustrates the waveforms found in a DPSK encoded signal stream. If it is assumed that a "0" binary value is represented by a 180° phase shift, then signal waveform 1, during time frames 1 and 2, represents a "1" bit and the phase shifted waveforms during time frames 3 and 3 are "0" bits. Note that delayed signal 2 lags signal 1 by one time frame. Thereafter, signal 1 and delayed signal 2 are summed so that output signal 3 exhibits a null signal value during each time frame wherein a phase reversal has occurred.

Typical bandwidths of commercially available single mode fibers, fiber amplifiers and femtosecond lasers make it possible, in principle, to achieve terabit-per-second optical fiber communications. In Ser. No. 08/758,437 to Warren et al., assigned the same Assignee as this Application, an optical communication scheme is described wherein a laser outputs a series of multi-femtosecond optical pulses. That optical pulse is applied to a grating which separates the optical pulse into its spectral components (e.g., approximately 1,000 resolvable frequency ranges or "frequency slots"). The resulting diverse frequency slots are then amplitude modulated by passing each spectral component through an acousto-optic modulator to achieve an amplitude modulation in accordance with applied data signals. The data signals from multiple transmitters are multiplexed, using a time division technique, and demultiplexing is accomplished by applying the amplitude modulated signals to an asymmetric optical demultiplexer, such as that shown in U.S. Pat. No. 5,493,433 to Prucnal et al., assigned to the same Assignee as this Application.

An important feature of the wavelength division transmission scheme described by Warren et al. is that each of the spectral components into which the incident femtosecond laser pulse is separated, is time coherent with respect to all other spectral components. The coherence of all the spectral components is due to their derivation from a common optical pulse. As will be understood from the description of the invention below, it is this coherence property that enables implementation of a demodulation scheme to enable data recovery from phase-modulated optical frequency slots.

The use by Warren et al. of an amplitude modulated signal causes a average loss of approximately 50% of the optical energy in an average signal stream. It is known that phase modulation does not result in such a penalty.

Accordingly, it is an object of this invention to provide an improved wavelength diversity, spread spectrum optical data communications system wherein DPSK modulation is utilized.

It is another object of this invention to provide a spread-spectrum optical communication system wherein demodulation apparatus for detecting DPSK encoded data makes use of known interferometric structures.

SUMMARY OF THE INVENTION

A DPSK communication system employs an optical signal which comprises plural, coherent, optical frequencies, each optical frequency positioned within a range of frequencies (i.e., a "frequency slot"). The optical signal comprises plural frequency slots, with the wavefront in each time segment of each frequency slot being phase modulated in accordance with data signals. Plural frequency slots are transmitted "in parallel", in each of a plurality of succeeding time segments. A demodulator includes first and second optical paths and a coupler which separates a received wavefront into first and second components, the first component directed onto the first optical path and the second component directed onto the second optical path. An electro-optic modulator (in the preferred embodiment) is positioned in at least one of the optical paths and is responsive, during a time segment, to a first applied control signal, to alter the phase, and thus the frequency, of the first component by approximately one frequency slot. As a result, the frequency slots of the first component are offset in frequency by a frequency slot from the frequency slots of the second component. At the output of the first and second optical paths, an optical coupler interferes the first component and the second component so as to enable constructive and destructive interference therebetween in accordance with respective phase modulations thereof. Since the first component has been offset by one frequency slot from the second component, a demodulation of the DPSK signal is enabled. Both Mach-Zehnder and Sagnac interferometric structures are employed to achieve the demodulation action.

BRIEF DESCRIPTION OF THE DRAWINGS

FIG. 6 is a schematic of a further TDMA demodulator that employs a Sagnac demodulation structure.

FIG. 7 is a schematic view of an electro-optic modulator that is usable in the demodulator shown in FIG. 6.

DETAILED DESCRIPTION OF THE INVENTION

Initially, the invention and its preferred embodiments will be described in a schematic fashion, using the showings of FIGS. 2–7. Thereafter, a more rigorous derivation will be presented illustrating the mathematical relationships which underlie the demodulation action of the invention.

Figure 1:
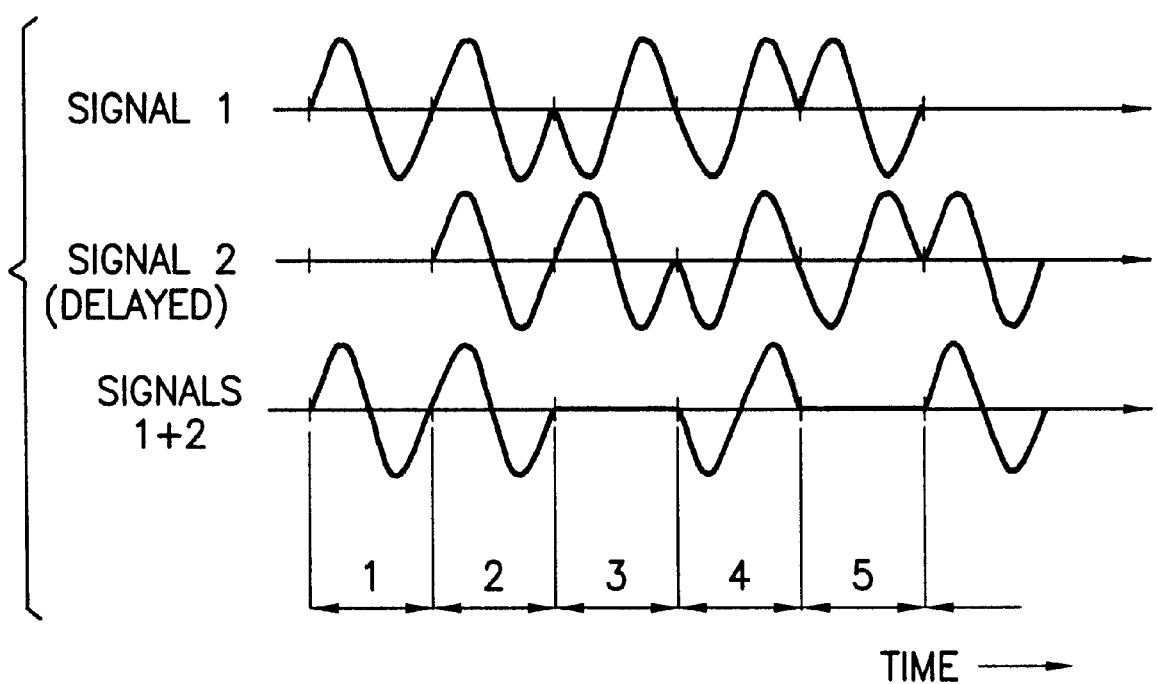
FIG. 1 illustrates signal waveforms used to achieve DPSK phase modulation.
Figure 2:
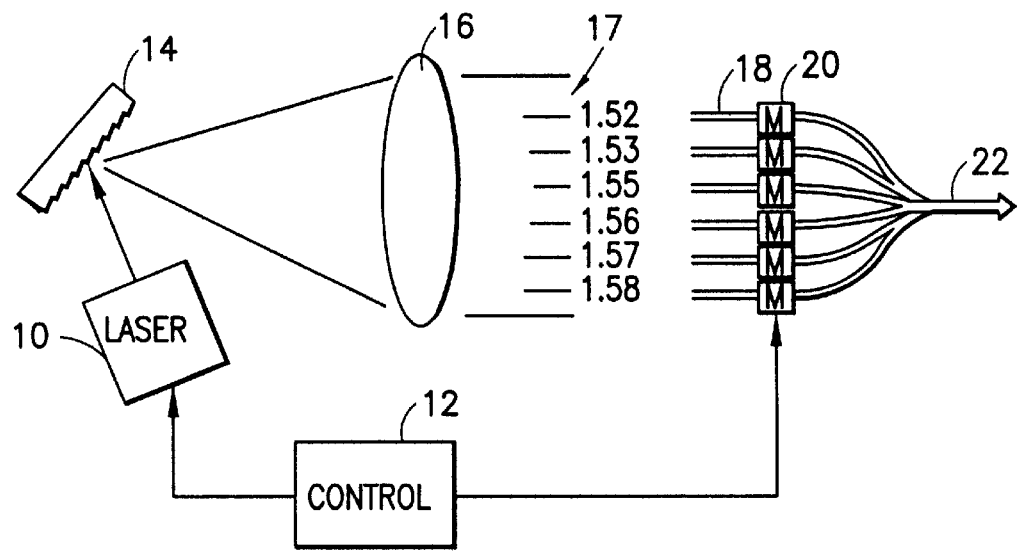
FIG. 2 is a schematic showing of an optical transmitter which enables DPSK modulation of plural spectral components of an optical signal.

Turning to FIG. 2, a mode locked laser 10 is pulsed by an output from control module 12. In response, laser 10 outputs a femtosecond duration pulse (e.g., 100 femtoseconds) towards a diffraction grating 14. There, the pulse, due to its wide bandwidth, is separated into its spectral components which are, in turn, directed towards collection lens 16.

Assuming that the spectral components are centered at approximately 1.55 micrometers, collection lens 16 arranges the spectral components, approximately as shown at 17 in FIG. 2. Each spectral component is coupled to a respectively positioned fiber/receiver 18 which, in turn, passes the spectral component to an associated modulator 20.

Control module 12 phase modulates each spectral component by application of a phase control signal to each respectively associated modulator 20. Control module 12 modulates all of modulators 20, simultaneously so that a wavefront is created with each spectral component evidencing a phase modulation in accordance with applied modulating signals. Optical paths 18 are adjusted in length so that, in the absence of a modulation signal, the output at combiner 22 is exactly the same as the input pulse An important and fundamental feature of system of FIG. 2 is that each of the spectral components in the diverse frequency slots is phase coherent, in that it is derived from a common source signal. The phase coherence is utilized in each of the coherence demodulators described below to enable detection of data in the phase modulated signals.

Figure 3:
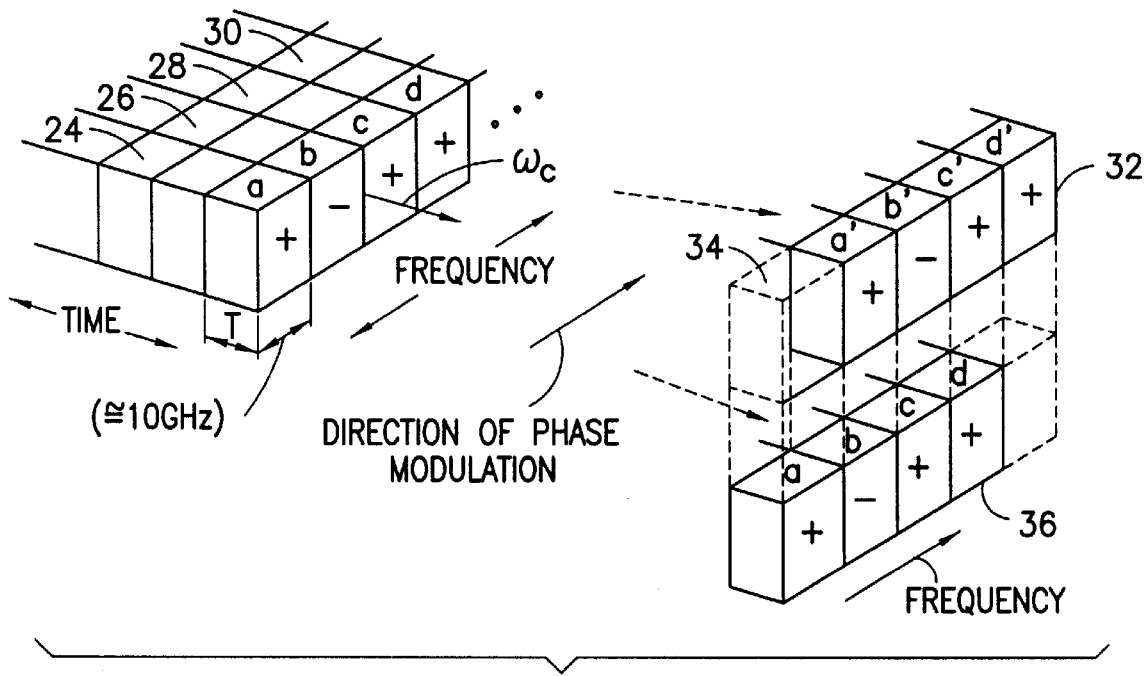
FIG. 3 is a schematic showing of spectral components in plural frequency slots and their respective phase modulations, and further illustrates the frequency shift effect of a demodulator incorporating the invention.

Referring to FIG. 3, a schematic is shown of a wavefront exiting from modulators 20. Adjacent "beams" 24, 26, 28 and 30 each occupy a "slot" of spectral frequencies, each frequency slot, for example, being approximately 10 GHz "wide". Each frequency slot is separately modulated during a time segment T to exhibit either a 0° or 180° phase, in accordance with an applied data signal. Thus, beam 24 at time T exhibits signal "a" that is represented, for example, by a 0° phase modulation. Beam 26, by contrast, exhibits an optical signal "b" which is represented by a 180° phase modulation.

Optical signals a, b, c and d are centered around optical frequency $\omega_c$. From FIG. 3, it can be seen that the direction of phase modulation is from a-to-d, etc., thereby evidencing a wavefront whose "first rank" of optical signals has a phase modulation relationship proceeding left to right along the wavefront.

Figure 4:
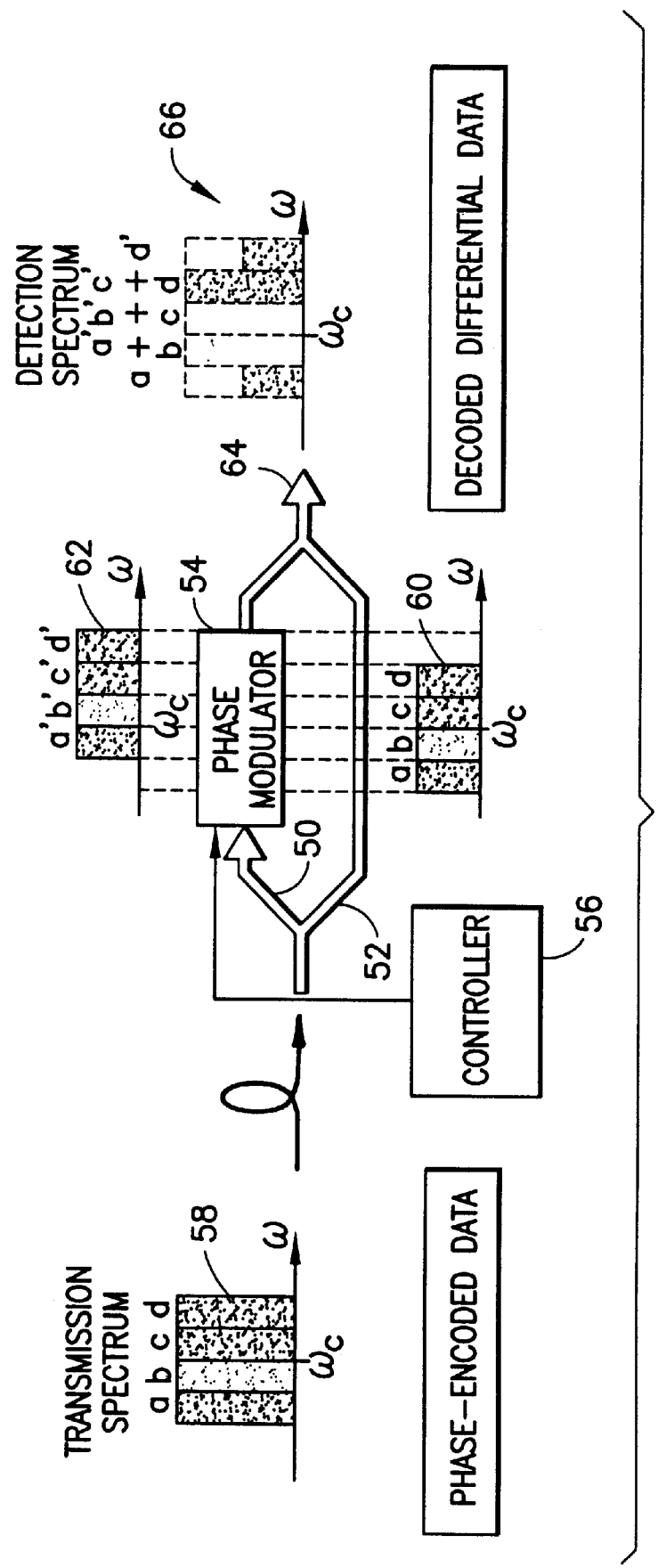
FIG. 4 illustrates a DPSK demodulator incorporating the invention hereof.
Figure 5:
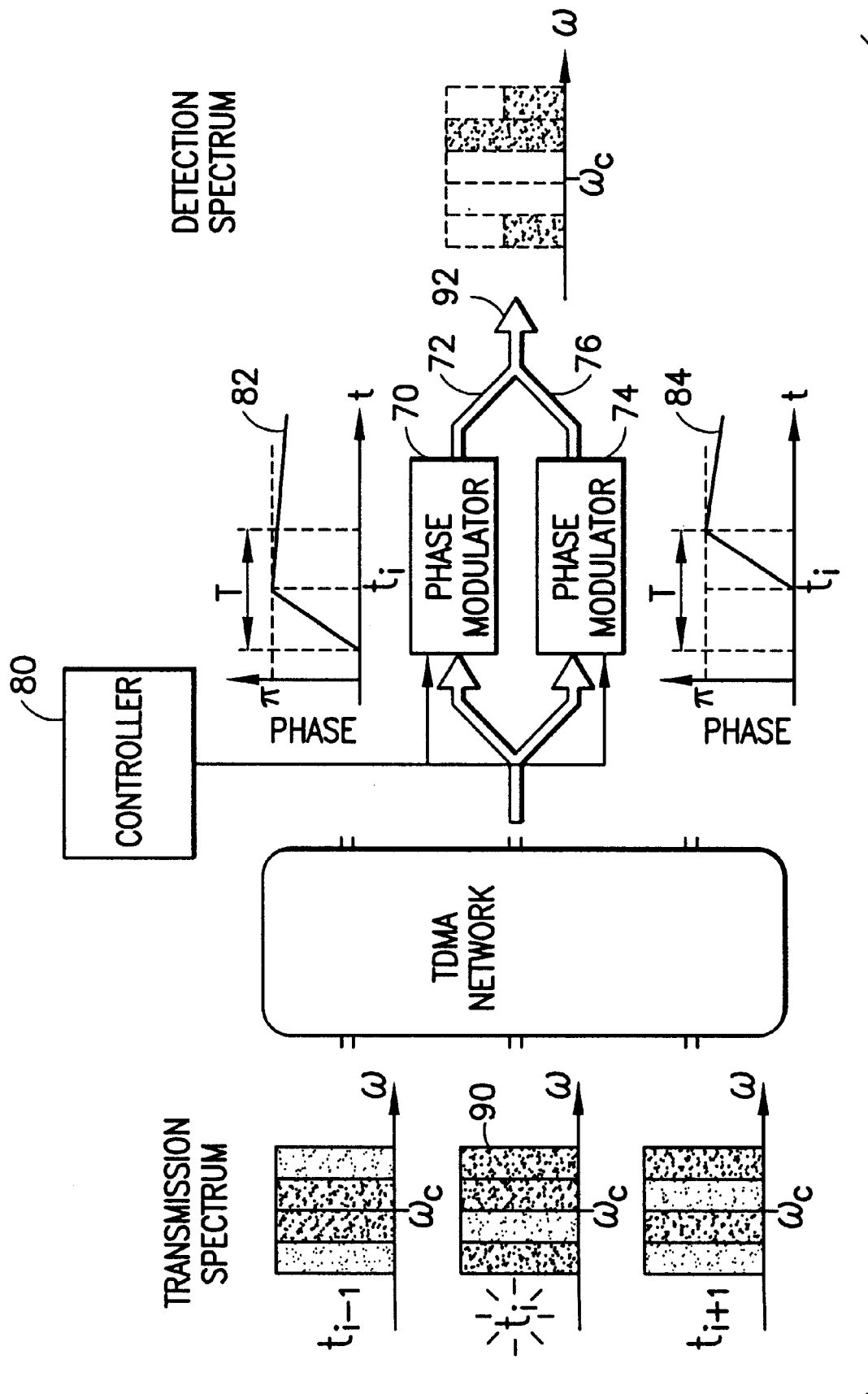
FIG. 5 illustrates a further embodiment of a DPSK demodulator which is especially useful for demultiplexing of a TDMA signal train.

As will hereafter be understood, that wavefront, in the demodulators shown in FIGS. 4–6, is separated into two component wavefronts along two optical paths of an interferometric demodulator. In at least one optical path of the demodulator, the translating optical wavefront is frequency shifted by one frequency slot with respect to the other translating wavefront so as to achieve a one slot offset in their respective frequency slot positions. Thus, upper modulated wavefront 32 is frequency shifted by the amount of frequency slot 34 with respect to the relative spectral positions of the frequency slots in modulated wavefront 36. In essence therefore, the phase modulation of wavefront 32 is shifted by one frequency slot from the phase modulation of wavefront 36, thereby enabling a DPSK demodulation of the wavefronts by destructive and constructive interference in a coupler.

Because each of beams 24, 26, 28 and 30 is derived from a single laser pulse (and its Fourier components), each thereof is coherent, even though each occupies a different frequency slot. Thus, in time segment T, when optical signal a' of wavefront 32 is combined with optical signal b of wavefront 36, even though their respective frequency slots are offset by one slot, the adjacent slot frequencies (and wavelengths) are sufficiently close that their respective coherence enables an effective destructive interference to occur when the signals are modulated with opposite phases. Further, an effective constructive interference occurs when such signals are respectively modulated to have the same phase (e.g., segments c' and d, respectively).

In each of the demodulators to be described below, the slot frequency shift shown in FIG. 3 is accomplished through use of, preferably, an electro-optic phase modulator. As is known to those skilled in the art, such a modulator comprises an electro-optic crystal to which a demodulation signal is applied. Typically, in this invention, the demodulation signal is a ramp function with a finite rise time (in the radio frequency regime). The demodulation signal is applied across the electro-optic crystal and causes a time varying phase shift of an optical beam passing therethrough. In effect, the time varying phase change creates a frequency shift of the optical signal and, in this invention, that frequency shift is made equivalent to a frequency slot. Of course, the demodulation signal is synchronized to enable detection of the signal in the correct time segment.

If it is assumed that the applied demodulation voltage V(t) is a ramp function exhibiting a linear rising edge slope of "a", then the modulation voltage can be described as follows:

$$V(t) = a \cdot t \quad \begin{array}{l} a : \text{constant} (=\text{slope}) \\ t : \text{time} \end{array}$$

usually, $$\phi(v) = b \cdot v \quad \begin{array}{l} b : \text{constant} \\ v : \text{voltage} \\ \phi : \text{phase shift} \end{array}$$

therefore, $$\phi(V(t)) = \phi(at) = bat$$

The modulated signal is:

$$\sin(\omega t + \phi(V(t))) = \sin(\omega t + bat)$$
$$= \sin((\omega + ba)t)$$

From the expression describing the modulated signal above, it can be seen that the applied, time varying phase shift causes a frequency shift in the optical output signal by an amount corresponding to the product of constants "a" and "b".

Turning now to FIG. 4, a simplified Mach-Zehnder demodulator is shown which includes two equal length optical pathways 50 and 52. An electro-optic phase modulator 54 is positioned in optical pathway 50 and receives a ramp signal from controller 56. If it is assumed that the phase encoded input spectrum is as shown at 58, an input coupler (not shown) causes one-half of wavefront 58 to travel along optical pathway 50 and one-half to travel along optical pathway 52. In the following description of the demodulation action, a normally "on" Mach-Zehnder device is considered, thus if no modulating signal is applied to phase modulator 54, the wavefronts constructively interfere at output 64. If a normally off device is chosen, the signal output data is inverted.

Input wavefront 58 is centered around frequency $\omega_c$, as is wavefront component 60 which passes along optical pathway 52. Phase modulator 54, in response to an applied ramp function, frequency shifts wavefront component 62 by one frequency slot with respect to the frequency slots occupied by wavefront component 60. As a result, when wavefront components 60 and 62 recombine at 64, both constructive and destructive interference occurs in accordance with the respective phase modulations of optical signals a, b, c and d in the respective frequency slots. Thus, as shown at 66, the output at 64 enables phase modulated signal "a" from wavefront component 60 and phase modulated signal "d'" from wavefront component 62 to exit unaffected. However, destructive interference occurs between oppositely phase modulated signals a' and b, and b' and c, respectively, of wavefront components 62 and 60. Signal c' of wavefront component 62 constructively interferes with signal d of wavefront component 60, resulting in output of demodulated spectrum 66.

In practical applications, demodulation takes place repeatedly as wavefronts are received in a sequence of periodic time segments. This requires that the demodulation voltage rise in a ramp-wise manner whenever a wavefront arrives at the demodulator to achieve the desired frequency shift. However, if the demodulation voltage is thereafter rapidly returned to its initial state, another optical signal frequency shift will occur resulting in a further demodulation action and a wavefront in an unwanted time segment will appear in the output. This action is inhibited by assuring that the demodulating signal is allowed to relax slowly. Nevertheless, this relaxation still causes a continuing and changing phase shift to be induced in an optical signal passing through the modulator, for the duration of the relaxation effect. This problem is avoided in the configuration shown in FIG. 5.

Referring to FIG. 5, a TDMA demultiplexer will be described wherein a normally off Mach-Zehnder optical interferometer is employed. A first phase modulator 70 is positioned in optical pathway 72 and a second phase modulator 74 is positioned in optical pathway 76. Each of phase modulators 70 and 72 is configured from an electro-optic modulator. Optical pathways 72 and 76 are configured to have lengths so that, lacking any modulation, the output of the interferometer is dark (i.e., a 180° phase difference)—due to destructive interference between the non-phase shifted optical signals appearing on pathways 72 and 76.

If only one phase modulator is present in an optical pathway and the other optical pathway includes no modulator, the phase shift occurring as a result of the control signal relaxation applied to the one phase modulator will cause a changing frequency shift of optical signals present in the respective optical pathway. As a result, indeterminate light and dark outputs will occur due to the continuously changing phase shift caused by the relaxation effect. This effect is avoided by positioning phase modulators in both optical pathways.

A controller 80 applies a first ramp function to phase modulator 70 sufficiently in advance of the wavefront occurring in time segment T to assure a desired one slot frequency shift of the wavefront at $t_i$. The application of the first ramp function causes phase modulator 70 to exhibit a phase shift characteristic 82 which increases until, at time $t_i$, a full 180° phase shift (and a frequency shift of one frequency slot) is induced in the wavefront in pathway 72. In this instance, it is assumed that time $t_i$ occurs approximately midway in TDMA time segment T.

Starting at $t_i$, controller 80 applies a second ramp function to phase modulator 74 which causes its phase shift to increase, as shown by characteristic 84. However, at time $t_i$, the wavefront containing the data modulated as shown at 90, is subjected to the one slot frequency shift. The phase shift created by phase modulator 74 occurs after the interfering wavefronts have been detected so the data which interferes at $t_i$ is not corrupted. However, both phase modulator 70 and phase modulator 74 now exhibit identical (or substantially identical) relaxation phenomenon so that, thereafter, wavefronts passing therethrough are subjected to identical phase delays and destructively interfere at output 92. In such manner, the demodulator of FIG. 4 is able to perform a "channel drop" at $t_i$, while ignoring wavefronts appearing at $t_{i+1}$ and $t_{i-1}$.

Turning to FIG. 6, a demodulator incorporating a Sagnac interferometer will be described. In this instance, a travelling wave phase modulator 100 is centrally positioned within a pair of optical propagation pathways 102 and 104. As is known, a signal input to a Sagnac interferometer, via an input optical pathway 106, is coupled by a coupler 108 into optical pathways 102 and 104. The induced signal propagates in optical pathway 102 in a counter-clockwise direction, whereas in optical pathway 104, the induced signal propagates in a clockwise direction.

To achieve the requisite phase delay (and frequency shift of one slot), a traveling-wave phase modulator 100, such as shown in FIG. 7, is employed. An electro-optic crystal 110 is sandwiched by a modulation electrode 112 and a reference electrode 114, which together form a waveguide. An input pulse is applied to modulation electrode 112 at one extremity thereof, via input 116. When an input ramp function is applied to modulating electrode 112, it propagates down the length thereof until reaching a terminating resistor 118.

The induced field propagates along the length of crystal 110 and induces a phase shift in an optical beam propagating therethrough. When the propagation speed of the induced field is matched to that of optical signal 120, the interaction length is longer and results in no lengthening of the risetime. In this case, the risetime of phase modulation is the same as that of the input ramp function. It can be shown that the risetime, or the inverse of the modulation bandwidth, for the counter-propagating optical signal 122 is twice the transit time of modulator 100. Therefore, the rise time of phase modulation applied to the optical signal propagating in the direction shown by arrow 122, is twice the transit time. For example, in order to achieve a 10 GHz frequency shift, a two cm long $LiNbO_3$ waveguide electro-optic modulator can be used. The risetime of phase modulation in direction 120 is nominally 100 picoseconds. However, for an optical signal traveling in direction 122, the rise time is approximately 350 picosecond. Therefore, applying a ramp function bias with a finite risetime, which is short compared with the transit time, will cause different amounts of frequency shift between optical signals propagating in directions 120 and 122.

Thus, returning to FIG. 6, if the difference between the frequency shifts in directions 102 and 104 is the same as one frequency slot, the wavefronts in directions 102 and 104 will produce desired constructive and destructive interference depending upon their respective phase modulations, as they are combined by coupler 108. As a result, the induced output on fiber 130 is as shown at 132.

What follows is a detailed mathematical consideration of the modulation/demodulation scheme of the invention:

Consider an n-channel network system whose key sequence is given by $\{a_1, \ldots, a_n\}$, $a_i \in \{0, \ldots, m-1\}$, where m is a positive integer. So far, only the m=2 case has been considered. In the following, the idea is generalized for the m-ary case. The corresponding DPSK sequence $\{\phi_0, \ldots, \phi_n\}$ is defined by the following relation:

$$\phi_i = \begin{cases} 0, & \text{for } i = 0, \\ \psi(a_i) + \phi_{i-1}, & \text{for } i = 1, \ldots, n, \end{cases} \quad (1)$$

where, $\Psi(a_i)$ is a phase modulation function, discussed below. An n-channel DPSK system requires (n+1) channels, since transmitted data is retrieved by the phase difference between adjacent channels. As mention above, the DPSK sequence is implemented in TDM channels in radio-frequency (rf) communication system. Thus, the differential phase between adjacent chips of TDM channels is obtained by either interfering or missing the received input signal and it's time-delayed signal by the time interval occupied by one TDM chip. However, in a frequency-domain DPSK, a spread-time system, where all wavelength components of the spread time, wavelength division modulation (STWDM) chips have coherence to another. Then, the differential phase is retrieved by an interferogram between adjacent STWDM chips by means of a frequency shift.

For such an FDDPSK system, femtosecond lasers are used for generation of the coherent STWDM signal. First consider a transfer-limited ultrashort optical pulse in the frequency domain. Without losing generality, a rectangle-shaped spectrum is assumed with spectral bandwidth $\Delta\omega$, for the sake of simplicity. The spectrum is then divided into (n+1) chips for STWDM:

$$\tilde{E}_S(\omega) = \sum_{i=0}^{n} C\, rect(\omega - \omega_i, \delta\omega), \quad (2)$$

where $E_s(\omega)$ is the complex field notation of an optical pulse as a function of radial frequency $\omega$, C is a constant, and the rectangle function is defined as $$rect(x, a) = \begin{cases} 1, & \text{for } -|a|/2 \leq x \leq |a|/2, \\ 0, & \text{otherwise.} \end{cases} \quad (3)$$

For the sake of convenience, assume that C=1 hereafter.

The central frequency and the bandwidth of i-th chip are given by $\omega_i = \omega_0 + \delta\omega i$ and $\delta\omega = \Delta\omega/(n+1)$, respectively, where $\omega_0$ is the central frequency of the longest wavelength chip. The DPSK sequence can be phase-encoded in the coherent optical pulse by use of a well-known femtosecond pulse shaping technology [1,2]. The phase-modulated STWDM signal is expressed as:

$$\tilde{E}_m(\omega) = \sum_{i=0}^{n} \exp(j\phi_i) rect(\omega - \omega_i, \delta\omega). \quad (4)$$

The receiver consists of either Mach-Zehnder or Sagnac interferometer with a device for optical frequency shift by $+\delta\omega$ on one arm, and an n-channel spectrum analyzer with a $\delta\omega$ resolution as the detector. Because of the frequency shift, (i−1)th component will have the same central frequency as that of ith component:

$$\exp(j\phi_{i-1} + j\Delta) rect(\omega - \omega_i, \delta\omega). \quad (5)$$

Here $\Delta$ is the phase difference in the transmission direction between the two arms of the interferometer; for normally-off receiver, $\Delta = \pi$. Then, the i-th STWDM chip on the detector can be obtained:

$$\tilde{E}_i^{det}(\omega) =$$

$$\begin{cases} \dfrac{1}{2} rect(\omega - \omega_0, \delta\omega)[-\exp(j\phi_0)], & \text{for } i = 0, \quad (6a) \\ \dfrac{1}{2} rect(\omega - \omega_i, \delta\omega)[-\exp(j\phi_{i-1}) + \exp(j\phi_i)], & \text{for } i = 1, \ldots, n, \quad (6b) \\ \dfrac{1}{2} rect(\omega - \omega_{n+1}, \delta\omega) \exp(j\phi_n), & \text{for } i = n+1. \quad (6c) \end{cases}$$

Using $\Psi(a_i) = \phi_i - \phi_{i-1}$, the corresponding intensity spectra is found for i=1, ..., n which are of interest:

$$I_i^{det}(\omega) = \frac{1}{2} rect(\omega - \omega_i, \delta\omega)[1 - \cos(\psi(a_i))]. \quad (7)$$

Thus the phase information is converted to intensity modulation, where the original sequence is directly retrieved from the DPSK sequence.

The detection (Eq. 6) has redundancy if the value assignment of $\Psi(a_i)$ varies from 0 to $2\pi$. This redundancy can be, of course, eliminated by detection in another quadrature with a $\pi/2$ phase difference between the two arms of the interferometer. In order to keep the detection system simple, a phase variation only in a range of 0 to $\pi$ is considered.

In a low-noise system, $\Psi(a_i)$ can be assigned in any arbitrary manner. However, in a practical system at the high-noise limit, the receiver error rate can be reduced by having the value assignment of $1-\cos(\Psi(a_i))$ equally spaced in the intensity domain, by the following assignment:

$$\Psi(a_i) = \arccos(1 - 2a_i/(m-1)). \quad (8)$$

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A differential phase shift keying (DPSK) communication system employing an optical signal comprising plural, coherent, optical frequencies, each optical frequency positioned in a range of frequencies, each range of frequencies hereafter called a "frequency slot", said optical signal comprising plural frequency slots, each frequency slot phase modulated in accordance with data signals in each of plural succeeding time segments, said communication system comprising:

at least a first optical path and a second optical path of approximately equal oath lengths;

means for dividing said optical signal into first and second components, and applying a first component onto said first optical path and a second component onto said second optical path;

first modulating means positioned in at least said first optical path and responsive, during a time segment, to an applied first control signal, to alter a phase and frequency within a time segment of said first component by about one frequency slot; and output means coupled to said first modulating means and said second optical path for interfering said first component and said second component so as to enable constructive and destructive interference therebetween in accordance with phase modulations of optical frequencies in a common time segment in each of the frequency slots thereof.

2. The DPSK communication system as recited in claim 1, wherein said first optical path and second optical path cause an approximately 180° phase difference in said first component and second component propagating therethrough so that in an absence of said first control signal, said first component and second component destructively interfere at said output means.

3. The DPSK communication system as recited in claim 1 further comprising:

a laser;

means for causing said laser to output an optical pulse having a duration of less than approximately 100 femtoseconds;

optical diffraction means for receiving said optical pulse and separating said optical pulse into spectral segments, each segment comprising a frequency slot; and means for phase modulating time segments of each of said frequency slots to create said optical signal.

4. The DPSK communication system as recited in claim 1, wherein said first modulating means is an electro-optic modulator.

5. The DPSK communication system as recited in claim 1, further comprising:

second modulating means positioned in said second optical path; and control means for applying said first control signal to said first modulating means to cause an alteration, during a time segment, of said phase and frequency of said first component, said control means applying a second control signal, after application of said first control signal, to said second modulating means to thereby induce a phase and frequency shift of said second component, said first control signal and second control signal causing said first modulating means and second modulating means to exhibit relaxation effects for a period after application of each control signal so as to subject said first component and second component to substantially identical phase and frequency shifts subsequent to said time segment.

6. The DPSK communication system as recited in claim 5, wherein said first modulating means and second modulating means are electro-optic modulators.

7. The DPSK communication system as recited in claim 6, wherein said optical signal comprises plural time segments, each time segment containing plural phase modulated frequency slots, said first control signal applied during a selected time segment so as to enable said constructive and destructive interference of phase modulated frequency slots present therein and, wherein applied control signals to said first modulating means and second modulating means cause destructive interference of phase modulated frequency slots in at least a next time segment after said selected time segment.

8. The DPSK communication system as recited in claim 1, wherein said first optical path and second optical path are configured as opposite direction propagation pathways in first and second arms of a Sagnac interferometer, and said first modulating means is positioned to intercept oppositely propagating optical wavefronts in said first and second arms, said first modulating means comprising:

phase shift means for asymmetrically phase shifting optical wavefronts which propagate in opposite directions therethrough, and creating a relative one frequency slot shift of counter-propagating wavefronts so as to enable a destructive/constructive interference at an input coupler to said Sagnac interferometer of said phase shifted optical wavefronts.

9. The DPSK communication system as recited in claim 8, wherein said phase shift means comprises:

an electro-optic substrate having an elongated dimension and opposed ends coupled to said first and second arms, respectively; and electrode means positioned on said substrate for inducing a travelling wave electric field in said substrate, said travelling wave electric field inducing a relative, one frequency slot phase delay between said oppositely propagating wavefronts.

* * * * *